United States Patent
Chiang et al.

(10) Patent No.: US 6,892,473 B1
(45) Date of Patent: May 17, 2005

(54) PROCESS FOR REMOVING WATER FROM AMMONIA

(75) Inventors: Robert Ling Chiang, Basking Ridge, NJ (US); Roger Dean Whitley, Allentown, PA (US); Dingiun Wu, Macungie, PA (US); Chun Christine Dong, Macungie, PA (US); Madhukar Bhaskara Rao, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/730,505

(22) Filed: Dec. 8, 2003

(51) Int. Cl.$^7$ .................................................. F26B 3/00
(52) U.S. Cl. .......................... 34/332; 34/472; 502/208; 423/574.1; 95/95
(58) Field of Search .......................... 34/302, 307, 329, 34/332, 337, 343, 472; 564/487, 469; 510/405; 502/73, 208; 423/574.1, 403; 95/95, 98

(56) References Cited

U.S. PATENT DOCUMENTS

| | | | |
|---|---|---|---|
| 3,275,571 A | * | 9/1966 | Mattox ........................ 502/65 |
| 4,433,981 A | | 2/1984 | Slaugh et al. |
| 4,761,395 A | | 8/1988 | Tom et al. |
| 4,950,419 A | | 8/1990 | Tom et al. |
| 4,983,363 A | | 1/1991 | Tom et al. |
| 5,496,778 A | * | 3/1996 | Hoffman et al. ........... 29/25.01 |
| 5,531,971 A | | 7/1996 | Tom et al. |
| 5,536,302 A | | 7/1996 | Golden et al. |
| 5,679,313 A | * | 10/1997 | Nojima et al. ............... 423/237 |
| 5,716,588 A | | 2/1998 | Vergani et al. |
| 6,110,258 A | | 8/2000 | Fraenkel et al. |
| 6,241,955 B1 | | 6/2001 | Alvarez, Jr. |
| 6,395,070 B1 | | 5/2002 | Bhadha et al. |
| 6,461,411 B1 | | 10/2002 | Watanabe et al. |
| 6,524,544 B1 | | 2/2003 | Alvarez, Jr. et al. |
| 6,723,402 B2 | * | 4/2004 | Nair et al. ................. 428/35.7 |
| 2003/0097929 A1 | | 5/2003 | Watanabe et al. |

FOREIGN PATENT DOCUMENTS

| | | |
|---|---|---|
| EP | 0 484 301 B1 | 10/1994 |
| EP | 0 470 936 B1 | 12/1994 |
| EP | 1 176 120 A1 | 1/2002 |
| JP | 9-142833 | 6/1997 |
| WO | WO 97/06104 | 2/1997 |
| WO | WO 00/23174 | 4/2000 |
| WO | WO 01/68241 A2 | 9/2001 |
| WO | WO 03/037485 A1 | 5/2003 |

* cited by examiner

*Primary Examiner*—Stephen Gravini
(74) *Attorney, Agent, or Firm*—Geoffrey L. Chase

(57) ABSTRACT

This invention relates to an improvement in a process for removing water from a hydride gas, and particularly ammonia, by contacting the hydride gas with a drying agent under conditions for effecting removal of the water. The improvement for significantly reducing the water content to trace levels in said hydride gas resides in the use of at least Group 1 metal oxide and at least one Group 2 metal oxide as a drying agent.

19 Claims, No Drawings

PROCESS FOR REMOVING WATER FROM AMMONIA

BACKGROUND OF THE INVENTION

Ultra-high purity ammonia ($NH_3$) is used in the electronics industry for integrated circuit (IC) and light emitting diodes (LED) manufacturing. Water is one of the major contaminants that must be removed to a concentration of 40 parts per billion (ppb) or less. Even though such low concentrations of water can be achieved in the ammonia manufacturing process, contamination is possible during subsequent shipping, handling, or at the point of use. There is a need for a point-of-use purifier (for bulk streams) or built-in purifier (for cylinders) including a drying agent to insure that water concentration is at 40 ppb and generally less before being used.

There are a number of physical and chemical adsorption methods in the prior art for removing water and other oxygen-containing impurities from hydride gases such as ammonia and inert gases. The following patents and articles are representative of the prior art.

U.S. Pat. No. 5,536,302 teaches a process for removing trace levels of oxygen from an inert gas, e.g., nitrogen and oxygen, via an adsorbent comprised of a porous reducing support impregnated with an alkali metal oxide or alkaline earth metal oxide of about 10 to 90% by weight. The oxides are formed from metal salts, such as, nitrates, acetates, benzoates, lactates, etc., the metals including cesium, sodium, potassium, and barium.

WO 97/06104 discloses a process for removing oxygen from ammonia via a getter material comprised of metallic iron and manganese present in a weight ratio of 7:1 and 1:1. Moisture is removed downstream of the oxygen removal process, by contact with a drying material. Examples of drying materials include barium oxide, calcium oxide, strontium oxide, or 3A zeolites.

U.S. Pat. No. 6,461,411 discloses a process for removing trace impurities, e.g., carbon dioxide and water to ppb and ppt levels from matrix hydrides, inert gases, and non-reaction gases including ammonia, phosphine, and arsine, etc., by contact with an activated gas purifier comprised of thermally activated unmodified organic aluminas and thermally activated modified inorganic aluminas under an inert gas. Modified aluminas are formed by treating the organic and inorganic aluminas with a basic salt such as oxides, hydroxides, carbonates, acetates, or oxalates of Group IA or IIA metals.

U.S. Pat. No. 6,241,955 discloses a method of removing gaseous contaminant, e.g., oxygen and water, from a hydride gas by contacting the gas stream with a quantity of high surface area reduced metal oxide, which is in an oxidation state which is less than its maximum and but not lower than its lowest oxidation state. Oxides such as manganese or molybdenum oxides are preferred although oxides of barium, calcium, iron, lithium, potassium, rhenium, sodium, strontium, titanium, tungsten, and vanadium can also be used.

Japanese Patent 9-142833 discloses removal of water from ammonia by contacting the gas with an adsorbent comprising BaO, or a mixture containing BaO and CaO with BaO as the major compound, whereby water is removed through a chemical reaction with the metal oxide.

EP 1,176,120 discloses a process for removing water and other impurities to a level of less than 0.1 ppm from ammonia by contacting the ammonia with an adsorbent having manganese oxide and/or nickel oxide as an active ingredient on a porous support and thereafter with a zeolite. The adsorbent is prepared by reducing the metal oxide in hydrogen at temperatures greater than 500° C. for manganese and up to 350° C. for nickel. The ammonia may further be passed through a bed of synthetic zeolite with a pore diameter between 4 to 10 angstroms to remove oxygen, carbon dioxide, and moisture.

EP 0 484,301 B1 and 0 470,936 B1 describe processes for removing oxygen and other impurity gases from ammonia by the use of hydrogenated getter metal alloys comprised of varying amounts of zirconium (Zr), vanadium (V) and iron (Fe) with a preferred composition of 70% Zr, 24.6% V, and 5.4% Fe.

U.S. Pat. No. 6,110,258 and U.S. Pat. No. 6,395,070 disclose a method for removing water from a gas, particularly acid gases by contacting the gas with a zeolite that has a silica to alumina ratio above about 10. Prior to contact, the zeolite is heated to a temperature above 650° C. prior to contacting it with the gas.

U.S. Pat. No. 4,963,363 describes an apparatus for removing water, oxygen and other impurities from various gases such as arsine, phosphine, and ammonia by contact with a scavenger including a high surface area support with anions that are reactive towards the impurities.

U.S. Pat. No. 5,531,971 discloses a process for purifying gas streams such as hydrogen, hydride gases, and nitrogen by contact with a pyrolyzed metal scavenger deposited on a polymeric or macroreticulate polymer support. The pyrolyzed metals are selected from Group IA of the Periodic Table.

Physical adsorption by zeolites such as A and X has also been widely used as a means for removing water. These physical adsorbents are effective and have good capacity for inert gas purification. However, their efficiency and capacity for water removal from ammonia and other hydride gases are not sufficient. Accordingly, new adsorbents for effecting the removal of water are desired.

BRIEF SUMMARY OF THE INVENTION

This invention relates to an improvement in a process for removing water from a hydride gases, particularly ammonia, and inert gas, and by contacting the hydride gas or inert gas with a drying agent under conditions for effecting removal of the water. The improvement for significantly reducing the water content to trace levels in said hydride or inert gas resides in the use of at least one Group 1 metal oxide and at least one Group 2 metal oxide in their maximum oxidation state as a drying agent.

There are significant advantages which can be achieved by the practice of the invention and representative advantages include:

an ability to scavenge water and carbon dioxide from ammonia and other hydride gases to essentially non-detectable limits, e.g, down to 40 ppb and less; and, an ability to use a scavenger having a very high affinity for water, high capacity, and good water uptake kinetics at very low water partial pressures.

DETAILED DESCRIPTION OF THE INVENTION

The basis for this invention is that it has been found that water can be removed from hydride and inert gases, particularly ammonia, to trace levels by passing a gaseous hydride or inert stream over a drying adsorbent comprising a mixture of at least one alkali metal oxide and at least one alkaline earth metal oxide. As used herein, the term "trace" levels of water refers to approximately 40 ppb or less of water. In cases where residual or trace levels of carbon dioxide are present, such carbon dioxide may also be removed by the drying agent. These adsorbents often are incorporated into point-of-use purifiers and built-in-purifiers to remove contaminant water as desired.

Typically, hydride gases and inert gases are delivered to adsorbent systems having a water content of 500 parts per million (ppm), generally 100 ppm and less. In the initial process for preparing the gases for delivery, the water content is reduced by cryogenic means or by use of zeolites adsorbents. Many applications, particularly in the electronics industry, require water levels in hydride gases in the range of ppb level, e.g., below 40 ppb (detection limit), and the lower the better. Although a number of drying adsorbents can reduce the water content of a hydride gas to levels of 40 ppb and below, they often do not have sufficient capacity at these low water partial pressures to be suitable for applications such as in-line and bulk purification.

The drying adsorbent employed in the practice of this invention is comprised of a mixture of an alkali metal oxide and an alkaline earth metal oxide. The alkali metal oxide can be comprised of lithium oxide, sodium oxide, potassium oxide, cesium oxide, and the alkaline earth metal oxide can be comprised of magnesium oxide, calcium oxide, barium oxide, and strontium oxide. Other metal oxides can be included in combination with the drying agent as desired and these include manganese oxide, nickel oxide, and iron oxide.

The mixed metal oxides comprised of a Group 1 and Group 2 metal oxide, as the drying adsorbent, are carried on an inert support by first impregnating the support with a combination of an aqueous or non-aqueous solution of the corresponding metal salts. Examples of appropriate salts of the metals are nitrates, oxalates, benzoates, lactates, tartrates, acetates, succinates, and formates. Although water is preferred, other solvents can be used for dissolution of the metal salt and these include methanol, ethanol, acetone, or ether. Impregnation of the support with aqueous salts can be accomplished using methods well known in the art, for example, incipient wetness, spray impregnation, and thermal spontaneous dispersion.

The impregnation of the support is effected in a manner to achieve a weight loading of the mixed metal oxides based upon the combined weight of the support and mixed metal oxides is about 10 to about 90% by weight and from 30 to 40% by weight is preferred. The use of a support allows for an increased surface area for the drying agent and affords better contact with trace levels of water present in the gas.

Following impregnation, the support-salt combination is dried at approximately 50° C. to 120° C. for approximately 2 to 16 hours. Then, the dried impregnated support is activated by heating it under flowing gas, e.g., air to a temperature of about 200° C. to 600° C., typically 400 to 550° C., which decomposes the salt to the corresponding oxide. Residence time of the flowing oxidizing gas during activation, depending upon the activation temperature, is approximately 0.5 to 30 seconds; preferably 10 seconds. Successful decomposition of the metal salt to the oxide is ensured by holding the composite material at or above the decomposition temperature of the metal salt for at least about 1 hour. If complete oxidation of the respective metal is not effected, the metal, in its reduced state, may react with trace levels of oxygen which may be present in the hydride or inert gas and generate contaminant water.

The mixed metal oxides are employed in ratios to provide from 0.1 to 10 moles Group 1 alkali metal oxide per mole of Group 2 alkaline earth metal oxide. Preferably, the moles ratio of alkali metal per mole of alkaline earth metal oxide is from about 0.3 to 5. Specific alkali/alkaline earth metal oxide combinations are as follows; $K_2O/MgO$, $K_2O/BaO$, $Na_2O/MgO$, $Na_2O/BaO$, $Cs_2O/MgO$, $Cs_2O/BaO$, $Li_2O/MgO$ and $Li_2O/BaO$.

The support for carrying the mixed metal oxides is a substrate having a plurality of pores and a surface area that ranges from about 100 to about 1500 $m^2/g$. Examples of supports are titania, alumina, zeolites. The preferred support is alumina.

Drying of the hydride or inert gas is effected by passing the gas over the oxide impregnated support, preferably at ambient temperature (approximately 20° C.). The pressure can range from about 1 to about 10 atmospheres; preferably 5 atmospheres. When the drying adsorbent becomes saturated, the drying adsorbent is replaced and the process continued.

The following examples are provided to illustrate various embodiments of the invention and are not intended to restrict the scope thereof.

General Procedure:

Two methods were used to evaluate the effectiveness of the test adsorbents. In the parallel method, a bed was packed with a test adsorbent and another bed filled with a commercial adsorbent. The bed filled with commercial adsorbent was sized such that it was not capacity limited. Flow of gas was fed to either bed at identical flow rates. The trace water content of the test bed was measured against the trace water content of the bed filled with commercial adsorbent. The difference in measured water content was indicative of the effectiveness of the test adsorbent in removing water.

The second method is characterized as the series method wherein the test gas was passed through the test bed first, and then, the treated gas from the test bed passed through the bed filled with commercial adsorbent and the trace water content measured. The series method, although similar to the first in principle, allows for some water absorption/desorption in pipes and is not a direct comparison to the first method. However, it is deemed quite suitable for comparison. This method was used to compare water removal with BaO alone as a single metal oxide.

Specific Breakthrough Test Process and Operating Condition

Process configuration: The test runs were generally carried out to breakthrough in an effort to gain information as to capacity, adsorption kinetics, and so forth. The test bed had a dimension of 0.85 cm inner diameter and 5 cm length. The empty space inside the vessel was filled with glass beads. The amount of media packed into the vessel for each adsorbent is listed in Table 1. The bed filled with the commercial adsorbent had a dimension of 1.5" diameter and 4.5" long.

Feed: A mixture of $N_2$ (7.5 vol %) and high-purity $NH_3$ with a $H_2O$ content of 200 ppb (92.5 vol %) was used as the feed for the breakthrough tests. The $N_2$ was from a moisture generator and the $H_2O$ concentration in the mixture was relatively stable at 1.8 ppm.

Operating condition: The water/ammonia mixture was passed through the test bed at a flow rate of 250 sccm. In the parallel method, the mixture was periodically shifted through the bed filled with the commercial adsorbent to obtain a reference $H_2O$ reading. The experiments were conducted under 84 psig and at ambient temperature (about 25° C.).

Analytical instrumentation: A MKS FTIR was used for $H_2O$ analysis. It has a method detection limit (MDL) of 40 ppb. Due to continuous downstream system drying and ambient temperature fluctuations, the $H_2O$ reading from FTIR can shift by approximately 50 ppb. To mitigate the temperature dependence, the $H_2O$ reading from the bed filled with the commercial adsorbent was used as the reference.

EXAMPLE 1

Preparation of Adsorbent Samples

Several adsorbents were synthesized and tested for their effectiveness in removing water from $NH_3$ per the general procedure. The following adsorbents were prepared in accordance with described procedure.

4A Molecular Sieve (comparative): The as-received commercial 4A molecular sieve had a particle size of about 2 mm in diameter and 5 mm in length. Prior to breakthrough test, the molecular sieve was ground to 16–20 mesh inside a glove box. TGA analysis indicated the ground adsorbent had 0.3% residual water.

5A Molecular Sieve (comparative): A 5A molecular sieve sample was prepared in conventional manner by activating it at 400° C. TGA analysis indicates that it had 1.12% residual water. The material was ground to 16–20 mesh inside a glove box after activation.

$BaO/Al_2O_3$ (comparative): A sample of $BaO/Al_2O_3$ was prepared by dissolving 76.4 g (~100 cc) AA300 ($Al_2O_3$ from Alcan) into a 50 cc $Ba(NO_2)_2$ solution (0.3 g $Ba(NO_2)_2.H_2O$ per cc $H_2O$). The solution was mixed well, then, the extra solution was decanted, and the adsorbent was dried at room temperature in a hood for overnight. The test sample then was ground to 16–20 mesh. 1.050 g sample of the ground $Ba(NO_2)_2/Al_2O_3$ was loaded into the test bed. The test bed was purged with nitrogen at a flow rate of 1 slpm. The test bed was heated at 100° C. for 24 hrs and at 300° C. for another 24 hrs. The BaO loading was estimated to be about 0.5 mmole/g of test adsorbent or 7 wt %.

$MgO$—$K_2O/Al_2O_3$: A sample of $MgO$—$K_2O/Al_2O_3$ was prepared by depositing an aqueous solution of magnesium acetate tetrahydrate ($Mg(C_2H_3O_2)_2$, ACS grade) and potassium acetate ($KC_2H_3O_2$, ACS grade) on $Al_2O_3$. The sample was dried and the dried, impregnated $Al_2O_3$ was ground to 16–20 mesh. The ground material was calcined at 550° C. for 4 hours in zero air (substantially free of water and carbon dioxide). The sample had a MgO loading of 0.4 mmole/g or 1.6 wt % and a $K_2O$ loading of 1.0 mmole/g or 9.1 wt % of the adsorbent.

EXAMPLE 2

Evaluation of Test Adsorbents

The test samples were evaluated for their effectiveness in the removal of water from ammonia per the general procedure as indicated. The results of the evaluation are reported in Tables 1–5.

TABLE 1

Water Removal Capacity and Efficiency for Test Adsorbents

| Adsorbent | Amount of adsorbent packed (g) | $H_2O$ capacity (mmole/g) | $H_2O$ efficiency (ppb) |
|---|---|---|---|
| 4A | 0.519 | 0.21 | <MDL |
| 5A | 0.539 | 0.18 | <MDL |
| $BaO/Al_2O_3$ | 0.712 | 0.35 | <MDL |
| $MgO$—$K_2O/Al_2O_3$ | 0.514 | >0.36 | <MDL |

TABLE 2

Water Concentrations during 4A Adsorbent Breakthrough Test

| Accumulated time (hrs) | $H_2O$ (ppb) when passing thru test bed | $H_2O$ (ppb) when passing thru commercial adsorbent | Difference in $H_2O$ concentration (ppb) |
|---|---|---|---|
| 15.2 | 14 | −1 | 15 |
| 63.2 | 31 | 29 | 2 |
| 86.7 | 41 | 5 | 36 |
| 94.6 | 67 | −2 | 69* |

*start breakthrough

TABLE 3

Water Concentrations For During 5A Adsorbent Breakthrough Test

| Accumulated time (hrs) | $H_2O$ (ppb) when passing thru test bed | $H_2O$ (ppb) when passing thru commercial adsorbent | Difference in $H_2O$ concentration (ppb) |
|---|---|---|---|
| 64.6 | 51 | 35 | 16 |
| 88 | 56 | −5 | 61* |

*start breakthrough

TABLE 4

Water Concentrations For $BaO/Al_2O_3$ Adsorbent Breakthrough Test

| Accumulated time (hrs) | $H_2O$ (ppb) when passing thru test bed | $H_2O$ (ppb) when passing thru commercial adsorbent | Difference in $H_2O$ concentration (ppb) |
|---|---|---|---|
| 50.5 | 22 | 2 | 20 |
| 87.5 | 12 | −2 | 14 |
| 95.2 | 35 | 19 | 16 |
| 111.7 | 51 | 37 | 14 |
| 135.5 | 9 | 1 | 8 |
| 159.6 | −15 | −23 | 8 |
| 231.7 | 157 | −24 | 181 |

* start breakthrough

TABLE 5

Water Concentrations during $MgO$—$K_2O/Al_2O_3$ Adsorbent Breakthrough Test

| Accumulated time (hrs) | $H_2O$ (ppb) when passing thru test bed | $H_2O$ (ppb) when passing thru commercial adsorbent | Difference in $H_2O$ concentration (ppb) |
|---|---|---|---|
| 14.8 | −30 | −35 | 5 |
| 22.8 | −29 | −33 | 4 |
| 38.8 | −31 | −32 | 1 |
| 62.9 | −28 | −30 | 2 |
| 71.1 | −12 | −6 | −6 |

TABLE 5-continued

Water Concentrations during MgO—K$_2$O/Al$_2$O$_3$ Adsorbent Breakthrough Test

| Accumulated time (hrs) | H$_2$O (ppb) when passing thru test bed | H$_2$O (ppb) when passing thru commercial adsorbent | Difference in H$_2$O concentration (ppb) |
|---|---|---|---|
| 97.4 | −20 | −20 | 0 |
| 134.3 | −37 | −34 | −3 |
| 158.6 | −31 | −29 | −2 |

The results in the above tables show that all the adsorbents could remove H$_2$O to a level approaching or below the detection limit of the FTIR (40 ppb). The following comments are relative to the tables.

Table 1 shows a summary of the capacity for the test adsorbents at a threshold level 40 ppb water. The results indicate that the adsorbent employing the mixed oxides, i.e., K$_2$O/MgO, had the highest capacity in millimoles water removed per gram adsorbent of all tested adsorbents. Given the same residence time for all tests, the reaction kinetics are equally as good as the prior art comparative adsorbents.

Table 2 shows the H$_2$O breakthrough and H$_2$O removal efficiency data for a 4A adsorbent. It was able to remove H$_2$O to a level similar to that of the commercial adsorbent. But, its capacity at the 40 ppb threshold level was the lowest among the tested adsorbents.

Table 3 shows the H$_2$O breakthrough and H$_2$O removal efficiency data for the 5A adsorbent. Since the stream was not passed through the commercial adsorbent during the first 65 hrs of the breakthrough test, it cannot be concluded whether the adsorbent could remove H$_2$O to a level lower than that of the commercial adsorbent. However, because the difference was only 16 ppb at the 65$^{th}$ hr of the breakthrough test, it is highly likely that the 5A adsorbent should be able to remove H$_2$O to a level below the FTIR detection limit.

Table 4 shows the H$_2$O breakthrough and H$_2$O removal efficiency for the BaO/Al$_2$O$_3$ adsorbent. The BaO/Al$_2$O$_3$ adsorbent was able to achieve water levels comparable to that of the commercial adsorbent and it had a capacity higher than that 4A and 5A molecular sieves.

Table 5 shows the H$_2$O breakthrough and H$_2$O removal efficiency data respectively for MgO—K$_2$O/Al$_2$O$_3$. Over the course of the runs, as shown in Table 1, the MgO—K$_2$O/Al$_2$O$_3$ had adsorbed 0.36 mmole/g and the experiment had not reached breakthrough. Comparing against all adsorbents tested, the drying agent comprised of the mixed metal oxides achieved water levels similar, and possibly below to the commercial adsorbent, and it had a capacity higher than either molecular sieve, i.e., 4A and 5A.

Summarizing the data and results from the tables, traditional water removal has been conducted by numerous methods, as evidenced by the adsorbents reported in Tables 2–3, including distillation and adsorption. Removal of water where the feed concentration oftne is in the 100 ppb range to levels below 40 ppb is difficult. To achieve meaningful capacity at these low partial pressures of water has been a major obstacle in drying by use of adsorbents. The breakthrough experiments as illustrated in Table 5 has shown that a combination of mixed Group 1 and 2 metal oxides have a much higher capacity for water than these other systems at these low partil pressures of water. In addition, they have the capability to reduce the water level in ammonia to levels below the limits of detection, i.e., 40 ppb.

Although not intending to be bound by theory, it is believed the combination of an adsorbent with a relatively strong chemical reactivity and another adsorbent with a relatively strong physical adsorption force can improve the drying efficiency and capacity of the adsorbent in hydride gases and inert gases. Comparing the two groups of metal oxides, the belief is that Group 1 metal oxides are stronger in chemical reaction with water due to the low valance of the metal ions, which allows forming a tight chemical bond between water and metal oxides especially at a very low water partial pressure; while the Group 2 metal oxides have a stronger attraction force to water molecules due to a relatively high ionic charge of the metal ion, which provides a higher chance of achieving contact of the water molecules with adsorbent surface. When a Group 1 metal oxide is used alone as an adsorbent, at the water partial pressure range of our interest, the limiting step of water removal is in effecting contact of the gas phase water molecules with the metal oxide. On the other hand, if only a Group 2 metal oxide is present in the adsorbent, the water removal at an extremely low water partial pressure is limited by the relatively low chemical reactivity of the metal oxide. Without forming a tight chemical bond, the physically adsorbed water can desorb automatically, resulting in a low equilibrium adsorption capacity. Therefore, it is our observation that the combination of Group 1 with Group 2 metal oxides increases the drying efficiency and capacity for hydride gases at the water partial pressure range of interest.

What is claimed is:

1. In a process for removing water from a hydride or inert gas which comprises contacting said hydride or inert gas stream with an effective quantity of a drying agent under conditions for effecting adsorption of said water, the improvement which comprises:

utilizing a mixture of metal oxides comprised of at least one Group 1 metal oxide and at least one Group 2 metal oxide as a drying agent.

2. The method of claim 1 where the mixture of metal oxides are dispersed on a porous support.

3. The method of claim 2 wherein the Group 1 alkali metal oxide is selected from the group consisting of sodium, potassium, lithium and cesium oxide.

4. The method of claim 3 wherein the Group 2 metal oxide is selected from the group consisting of calcium, magnesium, strontium, and barium oxide.

5. The method of claim 4 wherein the porous support has a surface area of at least 100 meters squared/gram.

6. The method claim 5 wherein the support is alumina.

7. The method of claim 4 wherein the activation temperature for forming the metal oxides is from 200 to 600° C.

8. The method of claim 4 wherein the drying agent is selected from the group consisting of K$_2$O/MgO and Cs$_2$O/MgO.

9. The method of claim 4 wherein the mole ratio is from 0.1 to 10 moles of Group 1 alkali metal oxide to Group 2 alkaline earth metal oxide.

10. The method of claim 9 wherein the mole ratio is from 0.3 to 5 moles of Group 1 alkali metal oxide to Group 2 alkaline earth metal oxide.

11. The method of claim 10 wherein the loading of mixed metal oxides is from 10 to 90% by weight of the combined support and metal oxide.

12. The method of claim 10 wherein the loading of mixed metal oxides is from 30 to 40% by weight of the combined support and metal oxide.

13. In a process for removing water from ammonia which comprises contacting said hydride or inert gas stream with an effective quantity of a drying agent under conditions for effecting adsorption of said water, the improvement for removing water from said ammonia, said water content of not greater than 500 ppm which comprises:

utilizing a mixture of metal oxides comprised of at least one Group 1 metal oxide and at least one Group 2 metal oxide as a drying agent.

14. The method of claim 13 where the mixture of metal oxides are dispersed on a porous support.

15. The method of claim 14 wherein the Group 1 alkali metal oxide is selected from the group consisting of sodium, potassium, lithium and cesium oxide.

16. The method of claim 15 wherein the Group 2 metal oxide is selected from the group consisting of calcium, magnesium, strontium, and barium oxide.

17. The method of claim 16 wherein the mole ratio is from 0.1 to 10 moles of Group 1 alkali metal oxide to Group 2 alkaline earth metal oxide.

18. The method of claim 17 wherein the mixed metal oxides are selected from the group consisting of $K_2O/MgO$, $K_2O/BaO$, $Na_2O/MgO$, $Na_2O/BaO$, $Cs_2O/MgO$, $Cs_2O/BaO$, $Li_2O/MgO$ and $Li_2O/BaO$.

19. The method of claim 18 wherein the drying agent is selected from the group consisting of $K_2O/MgO$ and $Cs_2O/MgO$.

* * * * *